C. X. CAMPBELL.
Hog-Traps.

No. 151,564.  Patented June 2, 1874.

Witnesses
C. Thurman
R. N. Dyer

Inventor:
Charles X. Campbell
by Geo. W. Dyer Co.
attys.

UNITED STATES PATENT OFFICE.

CHARLES X. CAMPBELL, OF SPRINGFIELD, ILLINOIS.

IMPROVEMENT IN HOG-TRAPS.

Specification forming part of Letters Patent No. 151,564, dated June 2, 1874; application filed April 6, 1874.

*To all whom it may concern:*

Be it known that I, CHARLES X. CAMPBELL, of Springfield, in the county of Sangamon and in the State of Illinois, have invented new and useful Improvements in Hog-Traps; and do hereby declare that the following is a full, clear, and exact description thereof.

The object I have in view is an improvement in hog-traps, for the purpose of conveniently catching and holding hogs, for the purpose of marking them, or inserting rings in their noses; and my invention therein consists in the novel construction and arrangement of a sliding gate, and the contrivances by which it is operated, and a folding door used in connection with a fence, as is more fully hereinafter explained.

In order to enable those skilled in the art to make and use my contrivance, I proceed to describe the same in connection with the drawings, in which—

Figure 1:
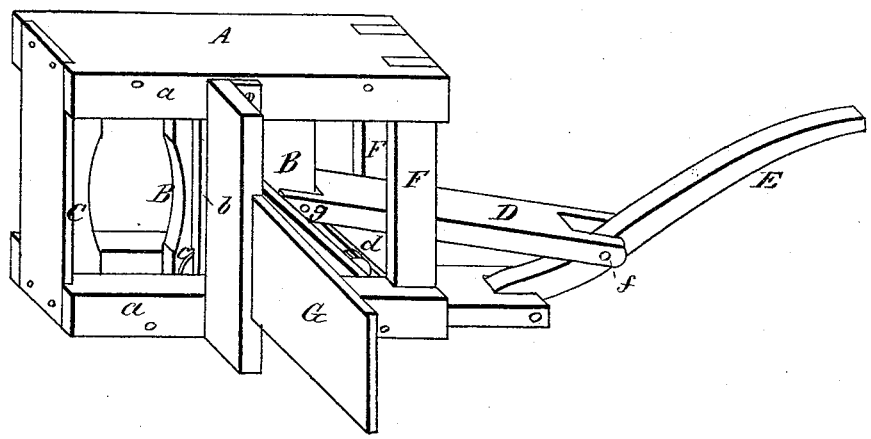
Figure 2:
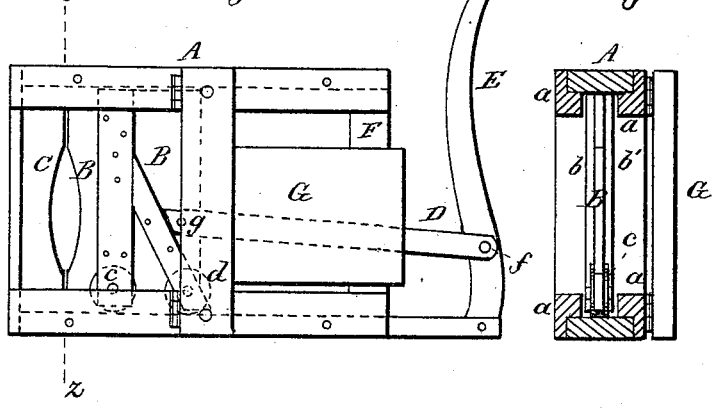
Figure 3:
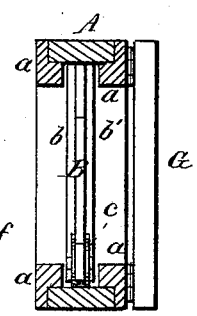

Figure 1 is a perspective view of the trap open. Fig. 2 is a side view with the trap closed; and Fig. 3, a cross-section on line $z\ z$, Fig. 2.

Similar letters denote like parts in each figure.

The frame A of the trap is rectangular in form, and should be of about the same height of an ordinary fence. The top and bottom bars of the frame are provided with flanges $a$ on each side, thus forming a groove in each for the reception of the movable gate B, which moves back and forth in the grooves thus formed. The gate B consists of a wide board strengthened by two pieces, $b$ and $b'$, on each side nailed to it, the pieces $b$ extending vertically across and near the left edge of the gate B, and the pieces $b'$ extending from the middle of $b$, angularly, to the right lower corner of B. In the lower ends of these pieces are pivoted the axles of two small wheels, $c$ and $d$, upon which the gate runs, the lower part of the gate B being scored out to receive them. Upon one side of the frame a board, C, is placed, which is scored out slightly to form a collar to conform somewhat to the neck of the animal to be caught, corresponding in that respect to the corresponding edge of the gate B. The gate B is moved back and forth by means of a connecting-rod, D, and lever E, the lever E being pivoted in a slot, $e$, in the bottom bar of the frame extended, and the connecting-rod D being attached to the gate B and lever E, at such points, $f$ and $g$, as will give the necessary movement to the gate B. The upright F of the trap is made in two parts, so as to allow for the play of the rod D, which moves between these parts. A door, G, attached to the trap is provided with hinges, fastened, respectively, to the upper and lower flange-pieces $a$ of the trap-frame, on the middle line of the trap. The trap is placed in the corner of any inclosure, forming part of the fence. The door G, being opened at right angles with the trap, forms a passage-way to the opening made when the lever E is down, and the gate B is withdrawn.

The animal, being driven into this passage, attempts to go through the opening, and is caught by the neck between the upright C and gate B by raising the lever E, in which position he is held for any purpose whatever, such as marking, inserting rings, &c. The lever E being raised and fastened, and the door G, which closes toward the lever E, being also secured, the trap becomes a closed fence, and, in conjunction with other portions of a fence, is available for that purpose.

Having thus described my invention, what I claim as new, and desire to secure by Letters Patent, is—

The combination, with the frame A and gate B, of the folding door G, constructed and arranged to operate substantially as described and shown, for the purpose set forth.

In testimony that I claim the foregoing I have hereunto set my hand this 24th day of March, 1874.

CHARLES X. CAMPBELL.

Witnesses:
- SAML. D. SCHOLES,
- F. C. MATHER.